United States Patent [19]
Chikuma et al.

[11] Patent Number: 5,172,369
[45] Date of Patent: Dec. 15, 1992

[54] OPTICAL PICKUP, OPTICAL INFORMATION RECORDING CARRIER AND RECORDING AND REPRODUCING APPARATUS THEREOF

[75] Inventors: Kiyofumi Chikuma; Sota Okamoto, both of Saitama, Japan

[73] Assignee: Pioneer Electronic Corporation, Tokyo, Japan

[21] Appl. No.: 637,036

[22] Filed: Jan. 3, 1991

[30] Foreign Application Priority Data

Mar. 2, 1990 [JP] Japan ................... 2-50945
Mar. 2, 1990 [JP] Japan ................... 2-90946

[51] Int. Cl.$^5$ .................... G11B 7/00; G02B 6/32
[52] U.S. Cl. ........................ 369/112; 385/33; 359/328; 369/44.14
[58] Field of Search ........... 369/112, 118, 121, 122, 369/44.14, 44.12, 44.23, 124; 250/201.5; 359/328, 332; 385/33, 122, 37

[56] References Cited

U.S. PATENT DOCUMENTS

| | | | |
|---|---|---|---|
| 4,626,679 | 12/1986 | Kuwayama et al. | 369/44.12 |
| 4,771,415 | 9/1988 | Taki | 369/121 |
| 4,892,375 | 1/1990 | Chikuma et al. | 385/33 |
| 5,058,981 | 10/1991 | Umegaki et al. | 385/33 |
| 5,072,437 | 12/1991 | Chikuma | 369/118 |

FOREIGN PATENT DOCUMENTS

| | | | |
|---|---|---|---|
| 0047239 | 3/1985 | Japan | 369/112 |
| 0047240 | 3/1985 | Japan | 369/112 |
| 0047241 | 3/1985 | Japan | 369/44.14 |
| 0015434 | 1/1990 | Japan | 369/122 |

*Primary Examiner*—Robert Weinhardt
*Assistant Examiner*—Thang V. Tran
*Attorney, Agent, or Firm*—Sughrue Mion Zinn Macpeak & Seas

[57] ABSTRACT

An optical pickup using a fiber type SHG, an optical information recording carrier and an information recording and reproducing apparatus. In the optical pickup, the primary ray which was removed in conventional arrangements is utilized thereby the same pickup can be used not only for an optical disk of a high density but also for an optical disk of a usual record density. To raise the recording density of the information recording carrier the laminated structure is utilized to record information. Two rays having different wavelengths are directed onto the record layer and onto the recordable layer of the optical disk, and the information recording and reproducing apparatus performs the reproducing of information as well as error detection and record/reproduction of information, so that a novel reproduction mode is realized.

6 Claims, 3 Drawing Sheets

RECORDING AND REPRODUCING RAY

OPTICAL PICKUP, OPTICAL INFORMATION RECORDING CARRIER AND RECORDING AND REPRODUCING APPARATUS THEREOF

BACKGROUND OF THE INVENTION

1. Field of the Invention

The present invention relates to optical pickups, more particularly to an optical pickup using a fiber type light-wavelength converting element, and also relates to an optical information recording carrier and a recording and reproducing apparatus thereof.

2. Description of Background Information

An example of optical pickups of that type is known in which the wavelength of a laser light beam generated from a laser light source is converted to a half using a light wavelength converter so that writing and reading of information for an optical disk can be performed at a higher density (reference is directed to Japanese patent application laid-open No. P61-50122).

A fiber type SHG (Second Harmonics Generator) using a secondary non-linear optical effect is an example of the light wavelength converter, and it adopts the phase matching of Cerenkov radiation. According to this system, second harmonic wave (hereinafter referred to as "SH wave") whose phase matching is performed nearly automatically can be generated.

In the fiber type SHG using the Cerenkov type of phase matching, the radiated SH has an intensity distribution of a ring shape and its equiphase surface is of a conical shape.

FIG. 1 shows an example of an optical pickup using the fiber type SHG in the prior art. In FIG. 1, a primary ray generated from a light source 1 such as a semiconductor laser is converged by a condenser lens 2 and incident to a fiber type SHG 3. The SH ray subjected to wavelength conversion by the fiber type SHG 3 into a half the wavelength of the primary ray is issued on the same optical axis and is incident into an axicon lens 4. In the axicon lens 4, the SH ray is converted into parallel rays. The SH ray converted into the parallel rays passes through a primary-ray cut filter 5, while the primary ray is interrupted by the filter 5. Since the polarization plane of the SH wave is of the P polarization, the SH wave passes through a beam splitter 6 and the polarization plane is converted from linear polarization into circular polarization at a λ/4 plate 7. Then the SH ray is converged by means of an objective lens 8 onto an information recording surface, for example, of an optical disk 9, i.e., an information recording carrier.

The reflected ray from the optical disk 9 passes through the objective lens 8 and its polarization plane is changed from the circular polarization into the linear polarization in the λ/4 plate 7. Then, the reflected ray is incident on the beam splitter 6. Since the incident ray of the beam splitter 6 passes through the λ/4 plate 7 twice in the outward and return paths, the polarization plane becomes S polarization, thereby the incident ray is reflected by the beam splitter 6 and passes through a condenser lens 10 and a cylindrical lens 11 and is incident on a light receiving surface of a so-called quadrants type light detector 12. The total sum of four outputs of the quadrants type light detector 12 is derived as a read RF signal, and further, by combination of the four outputs based on a known error producing method, focus error and tracking error signals are derived.

In the optical pickup using the fiber type SHG 3 in the prior art, since the primary ray is removed by the filter 5 and only the SH ray is used, such optical pickup can be used for playing the disk of high density but cannot be used for playing the optical disk on which information is recorded using the primary ray.

On the other hand, in an optical disk such as an optical information recording carrier (including a photomagnetic disk and a phase changing type disk), the diameter of the spot of the information reading ray must be decreased in order to raise the density of the recorded information. Consequently, in the prior art, the wavelength of the information reading ray is decreased as described above, or the numerical aperture NA of the objective lens for converging the information reading ray onto the information recording surface of the optical disk is enlarged, so that the diameter of the spot of the information reading ray is reduced diameter and information is recorded at a high density. However, the wavelength of short-wavelength light sources a reduced diameter is about 400 nm and the numerical aperture NA of the objective lens is about 0.6 in consideration of the practical use of the system. Consequently, limitations exist when an attempt is made to significantly improve the record density by decreasing the spot diameter of the information reading ray.

OBJECTS AND SUMMARY OF THE INVENTION

Accordingly, an object of the invention is to provide an optical pickup which can be used in playing an optical disk on which the recording is performed by either of the primary ray and the SH ray.

Another object of the invention is to provide an optical information recording carrier and a recording and reproducing apparatus thereof, which can improve the record density significantly and can realize a novel reproducing mode.

An optical pickup according to the invention comprises fiber type light-wavelength converting means for converting wavelength of source ray and radiating the converted ray as parallel rays on the same optical axis as that of the source ray, an optical system for converging each of the source ray and the wavelength converted ray radiated from the light-wavelength converting means onto an information recording surface of an information recording carrier, separating means for separating the source ray and the wavelength-converted ray conveyed via the information recording surface, and first and second light detectors for receiving the source ray and the wavelength-converted ray respectively separated by the separating means.

In the optical pickup according to the invention, wavelength of the source ray is converted by using fiber type light-wavelength converting means and the converted ray is radiated as parallel rays on the same optical axis as that of the source ray, and each of the source ray and the wavelength-converted ray is converged on the information recording surface of the information recording carrier and the source ray and the wavelength-converted ray conveyed via the information recording surface are separated and directed to each light receiving surface of first and second light detectors, so that the source ray is used in detection of the focus error, detection of the tracking error and reading of information from a recording carrier of the usual record density and the wavelength-converted ray is used in reading information from a high density recording carrier.

An optical information recording carrier according to the invention comprises a transparent substrate with one main surface one which a pit train according to predetermined information is formed, a selective reflection film laminated on one main surface of the transparent substrate for reflecting one of rays having different wavelengths and irradiated from the other main surfaces side and transmitting the other of the rays, and a recordable layer laminated on the selective reflection film responsive to the irradiation ray transmitted through the selective reflection film.

A recording and reproducing apparatus performing reproduction or recording and reproduction with such optical information recording carrier according to the invention comprises an irradiation optical system for radiating first and second rays having different wavelengths from each other on a same optical axis, a converging-optical system for converging the first and second rays onto one main surface of the transparent substrate in the recording carrier and onto the recordable layer respectively, separating means for separating the first and second rays conveyed via the recording carrier, first and second light detectors for receiving the first and second rays respectively separated by the separating means, first and second information reproduction processing systems for reproducing the recorded information based on each detection output of these light detectors, and an information record processing system for recording information for the recordable layer to which the second ray is irradiated.

In the recording and reproducing apparatus according to the invention, information is recorded and reproduced on and from an optical information recording carrier having a recording layer of a double-layer structure composed of a record layer to be used exclusively for the reproduction and a recordable layer enabling the recording and reproduction and a selective reflection film for reflecting one of irradiation rays having different wavelengths from each other and transmitting the other of the irradiation rays between the two record layers. The first and second rays having different wavelengths from each other and being radiated on the same optical axis are converged onto one main surface of the transparent substrate of the information recording carrier and onto the recordable layer respectively. The first and second rays conveyed via the information recording carrier are separated and introduced to the first and second light detectors, so that the information reproduction of the record layer is performed by the first ray and detection of the focus error, detection of the tracking error as well as the recording and the reproduction of information for the recordable layer are performed by the second ray.

DETAILED DESCRIPTION OF PREFERRED EMBODIMENTS

Preferred embodiments of the invention will now be described in detail referring to the accompanying drawings.

Figure 1:
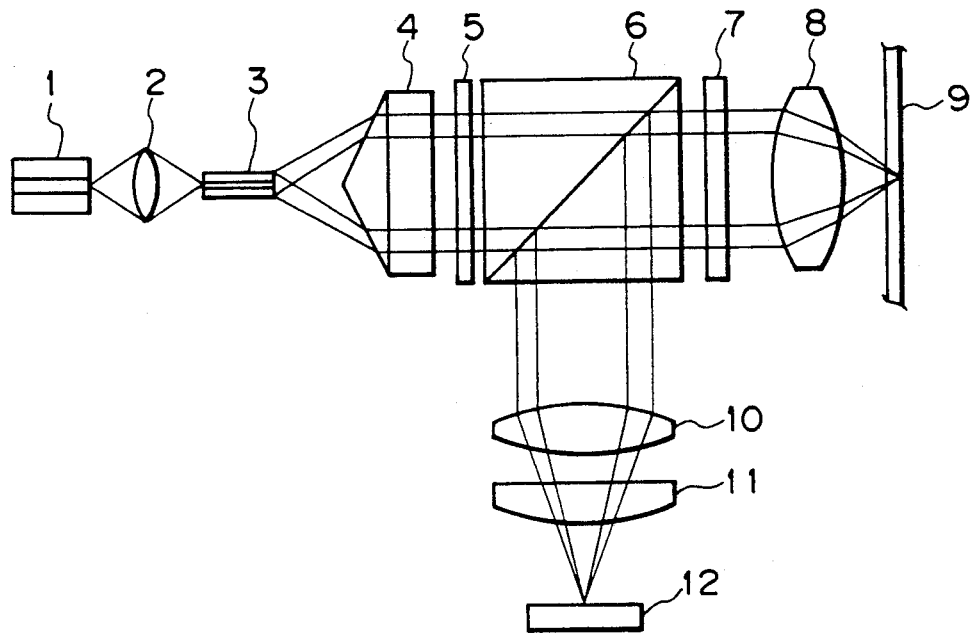
FIG. 1 is a structural diagram showing an example of an optical pickup in the prior art.
Figure 2:
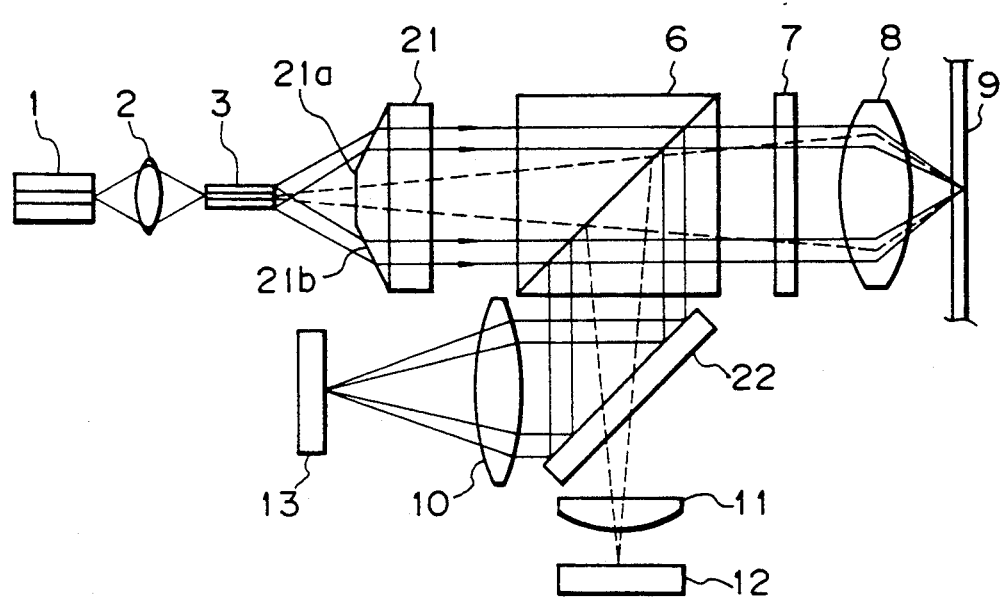
FIG. 2 is a structural diagram showing an optical pickup as an embodiment of the invention.

FIG. 2 is a constitution diagram showing an embodiment of an optical pickup according to the invention. In FIG. 2, similar parts to those in FIG. 1 are designated by the same reference numerals. Referring to FIG. 2, a primary ray (source ray) with a wavelength, for example, of 830 nm radiated from a core of fiber type SHG 3 and SH ray (wavelength-converted ray) as a result of wavelength conversion of the fiber type SHG 3 into a half the wavelength of the primary ray (415 nm) are incident on an axicon lens 21 truncated cone shape for example on the same optical axis. In the axicon lens 21 of truncated cone shape, the primary ray passes through a parallel plate-like portion 21a and the SH ray passes through a conical portion 21b. Since the primary ray passes through the parallel plate-like portion 21a, spherical aberration is generated due to its thickness, and since the SH ray passes through the conical portion 21b, it is converted into parallel rays. The primary ray and the SH ray pass through a beam splitter 6 since the polarization surface is P polarization, and both rays are incident on an objective lens 8 while the polarization surface is changed from linear polarization into circular polarization at the $\lambda/4$ plate 7. A lens to which the aberration correction is effected for both the primary ray and the SH ray is used as the objective lens 8. Due to the objective lens 8, the primary ray and the SH ray are converged onto an information recording surface of an optical disk 9.

The reflected ray from the optical disk 9 passes through the objective lens 8, and its polarization plane is changed from circular polarization into linear polarization (S polarization) at the $\lambda/4$ plate 7. The reflected ray from the optical disk 9 is further reflected by the beam splitter 6 and introduced to a dichroic mirror 22 and separated into the primary ray and the SH ray by the mirror 22. The primary ray passing through the dichroic mirror 22 passed through a cylindrical lens 11 for example and is incident to a light receiving surface of a four-divided light detector 12, and the SH ray reflected by the dichroic mirror 22 is converged onto a light receiving surface of a light detector 13.

In this case, the primary ray is used for the detection of the focus error, detection of the tracking error and the reading of information recorded on an optical disk of standard recording density using the primary ray. That is, four outputs of the quadrants type light detector 12 are supplied, for example, to a matrix circuit (not shown), and the total sum of the four outputs is derived as a read RF signal in the matrix circuit, and further a focus error signal and a tracking error signal are derived by combination of the four outputs based on the known error producing method. On the other hand, since the SH ray usually has a little power, it is not utilized in detecting the error signal but only in the reading of information of the optical disk of high density. That is, the detection output of the light detector 13 is derived as the read RF signal as it is.

Thus the primary ray, which was removed as an unnecessary component in conventional arrangements, is utilized in detecting the focus error, the tacking error and in the reading of information of the optical disk of standard recording density, and the SH ray is utilized in the reading of information from the optical disk of high density. Therefore, the same pickup can be used for reading not only information on the optical disk of high density but also information of the optical disk of the standard recording density. Also, since the primary ray can detect the error signal, the SH ray is not utilized for detecting error signals but only for reading the recorded information. Therefore, a high SN (signal to noise) ratio can be obtained in the reproduction of the optical disk of high density.

In the embodiment, the description has been performed in the case that the axicon lens 21 of truncated cone shape is used as an axicon lens which allows the primary ray to pass radiated from the core of the fiber type SHG 3 as it is and converts the SH ray into parallel rays. However, the invention is not limited to this, but in principle, the axicon lens may be configured such that the parallel plate-like portion 21a is replaced by a hollow space. However, since the axicon lens 21 of truncated cone shape can be easily manufactured in comparison to the hollow axicon lens and since the spherical aberration produced due to thickness of the parallel plate-like portion 21a can be positively utilized for the aberration correction, the degree of freedom for the aberration correction is increased by using the axicon lens 21 of the truncated cone shape.

Figure 3:
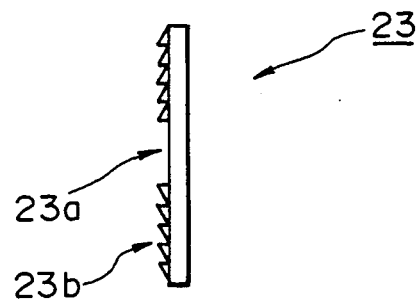
FIG. 3 is a side view of a Fresnel type axicon lens which can be used in place of an axicon lens of truncated cone shape in FIG. 2.

In place of the axicon lens 21 of a truncated cone shape, as shown in FIG. 3, a Fresnel type axicon lens 23 may be used where a center portion 23a is flat and a grating of a concentric circular shape with constant intervals is formed in the other portion 23b, so that the primary ray passes through the center portion 23a and the SH ray passes through the other portion 23b. Also in this case, similar effects of the above embodiment can be obtained.

Figure 4:
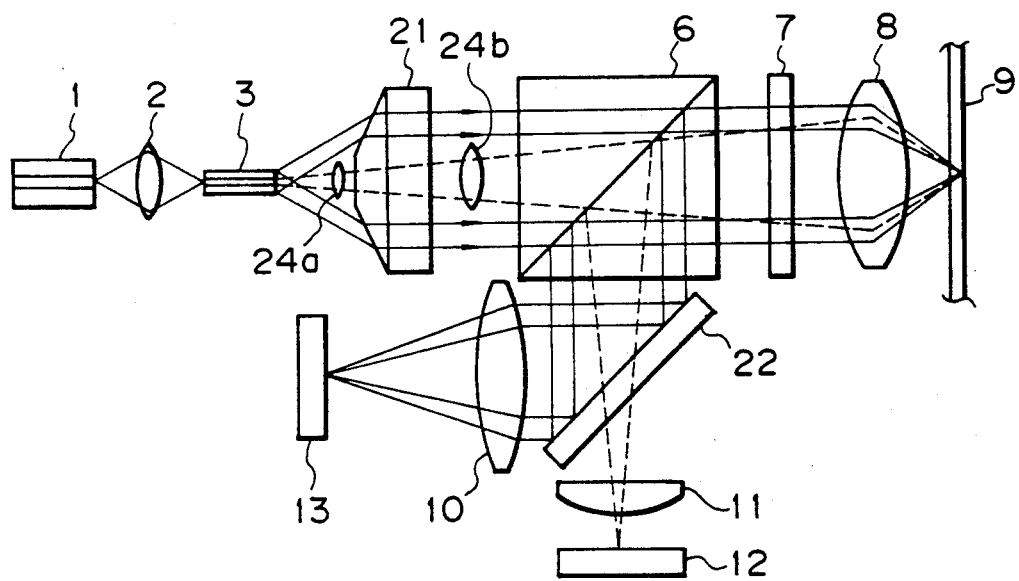
FIG. 4 is a structural diagram showing another embodiment of the invention.

Furthermore, in the aberration correction in the objective lens 8, if necessary, as shown in FIG. 4, aberration correcting lenses 24a, 24b may be added in an optical path where only the primary ray passes but the SH ray does not pass, or the upper surface of the truncated cone may be formed in a shape other than flat plane, such as spherical plane.

Moreover, in the above embodiment, although the description has been made for the case in which the primary ray and the SH ray is converged on the same recording layer, the objective lens 8 having the focal lengths slightly different for two wavelengths (830 nm, 415 nm in this example) may be used so that the primary ray and the SH ray are converged respectively onto different recording layers which are laminated. With such an arrangement, it may be used in the reading of the recorded information of each record layer of the optical record medium disclosed, for example, in Japanese patent application laid-open No. P60-18831.

As described above, in the optical pickup according to the invention, the wavelength of the source ray is converted using the fiber type SHG and the axicon lens, and the converted ray is issued as parallel rays along the same optical axis as that of the source ray. Further the source ray and the wavelength-converted ray is converged onto the information recording surface and are thereafter separated from each other and are incident on each light receiving surface of the first and second light detectors. Therefore, the source ray is used in the detection of the focus error, the tracking error and in the reading of information from the recording carrier of standard recording density and the wavelength-converted ray is used in the reading of information from the recording carrier of high density respectively. Therefore, the optical pickup can be used in the reproduction of the optical disk recorded by either of the primary ray or the SH ray.

Now, embodiments of an optical information recording carrier and a recording and reproducing apparatus according to the invention will be described in detail with reference to the accompanying drawings.

Figure 5:
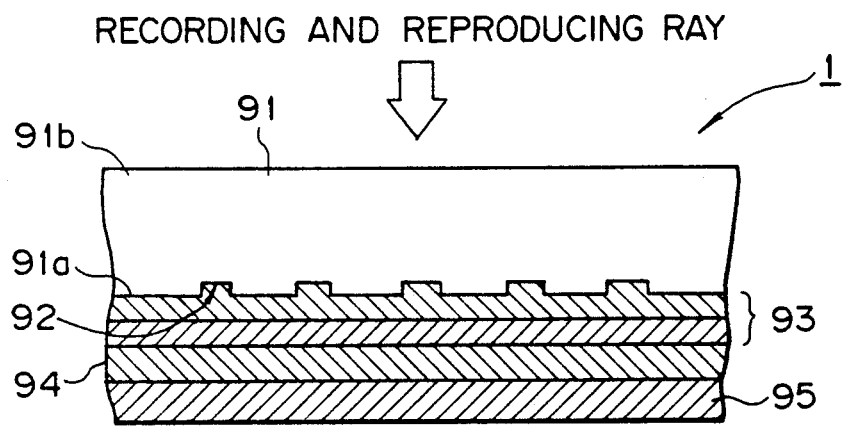
FIG. 5 is a sectional view showing an optical information recording carrier as an embodiment of the invention.

FIG. 5 is a sectional view showing an embodiment of an optical disk as an optical information recording carrier according to the invention. The optical disk 9 in this embodiment comprises a transparent substrate 91 made of PMMA or the like as a recording layer to be used exclusively for the reproduction where a pit train 92 according to predetermined information is previously formed on one main surface 91a, a selective reflection film 93 constituted by a dielectric multi-layer film of Ge, $MgF_2$-ZnS or the like which reflects one of irradiation rays having different wavelengths and irradiated from the side of the other main surface 91b of the transparent substrate 91 and transmits other of the irradiation rays, a recordable layer 94 made of Te - Fe - Co or the like to enable the recordation and the reproduction of the information by photomagnetic system for example, and a protective layer 95, these layers being laminated in the stated order.

Figure 6:
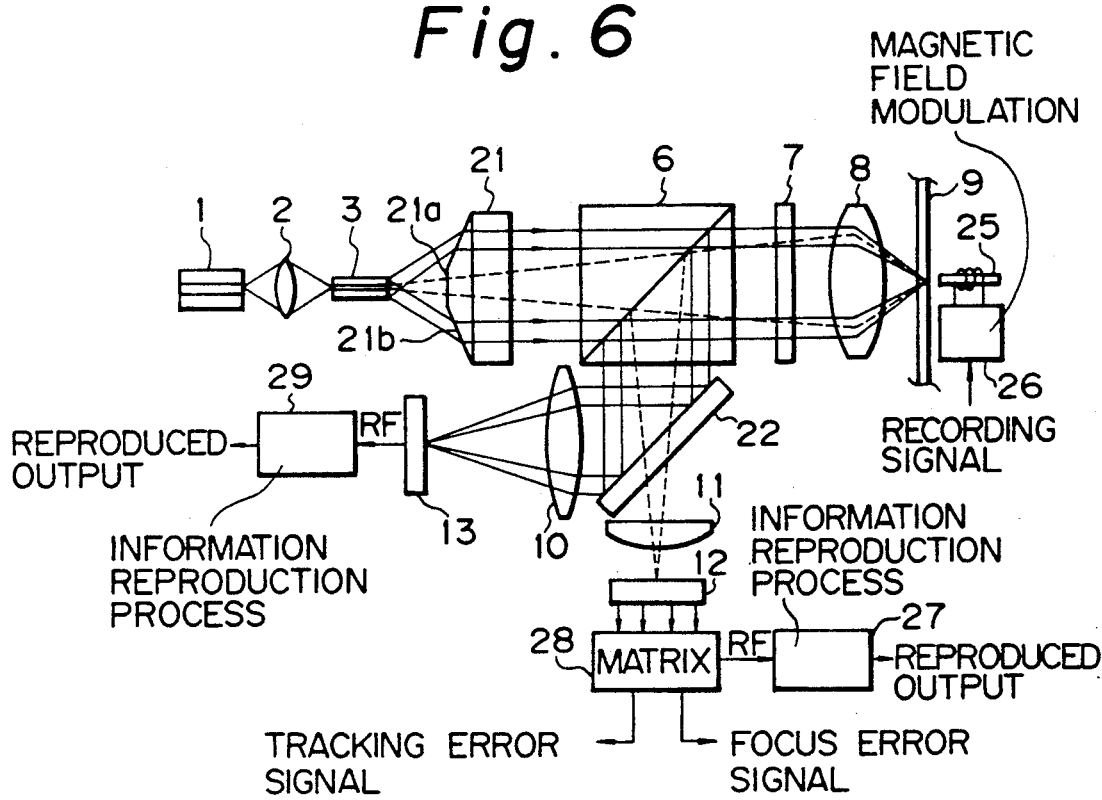
FIG. 6 is a structural diagram showing an embodiment of a recording and reproducing apparatus of such information recording carrier.

FIG. 6 shows an embodiment of a recording and reproducing apparatus for recording and reproducing the information to the optical disk 9 according to the invention. In FIG. 6, in the similar manner as the construction shown in FIG. 2, the primary ray (source ray) with wavelength of 830 nm, for example, generated from the light source 1 is converged by the converging lens 2 and is incident on a fiber-type light wavelength conversion element 3. The light wavelength conversion element 3 is a fiber type SHG (Second Harmonics Generator) using a secondary non-linear optical effect, and in which the phase matching of Cerenkov radiation is adopted. According to this system, a second harmonics (SH) to which the phase matching is performed nearly automatically can be generated.

The primary ray radiated from the core of the fiber type SHG 3 and the SH ray (wavelength-converted ray) having half the wavelength of the primary ray (415 nm) subjected to the wavelength conversion of the fiber type SHG 3 are incident, for example, on an axicon lens 21 of a truncated cone shape on the same optical axis. In the axicon lens 21 of the truncated cone shape, the primary ray passes through a parallel glass portion 21a and the SH ray passes through a conical portion 21b. Since the primary ray passes through the parallel glass portion 21a, spherical aberration is generated due to its thickness. Since the SH ray passes through the conical portion 21b, it is converted into parallel rays. The primary ray and the SH ray pass through a beam splitter 6 since the polarization surface is the P polarization. The polarization surface of these rays is converted from the linear polarization into the circular polarization at λ/4 plate 7, and the primary ray and the SH ray are incident on an objective lens 8.

The objective lens 8 to which the aberration correction effected for both the primary ray and the SH ray is used, and further the objective lens 8 having the focal lengths slightly different for two wavelengths (830 nm, 415 nm in this example) is used. Due to the objective lens 8, the primary ray is converged on a recordable layer 94 of the optical disk 9 and the SH ray is converged on one main surface 91a of a transparent substrate 91 respectively. In addition, the lens is arranged only at a region where the primary ray exists, so that the spot position can be adjusted in the direction of the optical axis where the primary ray and the SH ray are converged. At the rear surface side of the objective disk 9, an electromagnet, 25 generating a DC magnetic field, for writing or erasing the information on or from the recordable layer 94 of the optical disk 9, is provided, and the polarity can be inverted by a magnetic field modulation circuit 26 in response to the record signal.

The reflected ray from the optical disk 9 passes through the objective lens 8, and the polarization surface is changed from the circular polarization into the linear polarization in the λ/4 plate 7 so that the reflected ray is incident on the beam splitter 6. In this case, the incident ray of the beam splitter 6 passes through the λ/4 plate 7 twice in the outward and return paths and is therefore reflected by the beam splitter because of the polarization surface being the S polarization, and is further separated into the primary ray and the SH ray by a dichroic mirror 22. The primary ray passes through the dichroic mirror 22, and then passes through a cylindrical lens 11, for example, and is incident on a light receiving surface of a quadrants type light detector 12, and the SH ray reflected by the dichroic mirror 22 is converged onto a light receiving surface of a light detector 13.

In this case, the primary ray is used for the detection of the focus error, detection of the tracking error and the record and for the reproduction of the information of the recordable layer 94. Consequently, the four outputs of the quadrants type light detector 12 are supplied, for example, to a matrix circuit 28. In the matrix circuit 28, the total sum of the four outputs is derived as read RF signal, and further the focus error signal and the tracking error signal are derived by combination of the four outputs based on the error generating method, as is well known. The read RF signal is supplied to an information reproduction processing circuit 27 where a signal processing such as a demodulation process is performed and the reproduction output is derived. On the other hand, since the SH ray has little power generally, it is exclusively used in the reproduction of the recorded information by the pit train 12 previously formed on one main surface 11a of the transparent substrate 11. Consequently, the output of the light detector 34 is supplied as the read RF signal to the information reproduction processing circuit 29 where a signal processing such as the demodulation process is performed and the reproduction output is derived.

Thus, the optical disk 9 of the invention has such a structure that the transparent substrate 91, as a record layer to be used exclusively for the reproduction, and the recordable layer 94, to enable the recording and reproduction, are provided, and the selective reflection film 93 is provided between both record layers for reflecting one of irradiation rays having different wavelengths and transmitting other of the irradiation rays. With this structure, not only the lamination of the recorded information is attained and the record density is significantly improved, but also the record medium is realized, for example, while the image is regenerated by the SH ray, the voice information of the recordable layer 94 is rewritten by the primary ray.

In the embodiment describe above, although the irradiation optical system is constituted by using the fiber type SHG 3 and the axicon lens 21 of truncated cone shape, the invention is not limited to this but any constitution to enable radiation on the same optical axis of two rays being different from each other in wavelength may be used.

As above described, in the optical information recording carrier according to the invention, since the record layer to be used exclusively for the reproduction and the recordable layer to enable the record and the reproduction are provided, and the selective reflection film is provided between both record layers for reflecting one of the irradiation rays having different wavelengths and transmitting the other of the irradiation rays, lamination configuration of the recorded information is realized so that the record density can be significantly improved.

Also in the information record reproduction apparatus according to the invention, in recording and reproduction of information on and from the information recording carrier, the first and second rays having different wavelengths issued on the same optical axis are converged onto the information recording surface and the recordable surface of the record layer respectively, and the first and second rays conveyed via the information recording carrier are separated and led to the first and second light detectors. With this configuration the first ray performs the information reproduction of the record layer and the second ray performs detection of the focus error, the tracking error and the recording and reproduction of the information for the recordable layer. Consequently, a novel reproduction mode can be realized such that while the image is reproduced by means of the first ray, rewriting of voice information of the recordable layer is performed by means of the second ray.

What is claimed is:

1. An optical pickup comprising:
   fiber type light-wavelength converting means for converting a wavelength of a portion of a source ray to a smaller wavelength and for radiating a wavelength-converted ray as parallel rays on the same optical axis as that of the source ray;
   an optical system for converging each of the source ray and the wavelength-converted rays issued from said converting means onto an information recording surface of an information recording carrier;
   separating means for separating the source ray and the wavelength-converted ray conveyed via said information recording surface from each other; and
   first and second light detectors for respectively receiving the source ray and the wavelength-converted ray separated by said separating means.

2. An optical pickup as set froth in claim 1, wherein said height-wavelength converting means comprises a fiber type wavelength converting element for converting the wavelength of the source ray and for radiating a wavelength-converted ray on the same optical axis as that of the source ray, and an axicon lens for transmitting the source ray radiated from the light-wavelength converting element as it is and for converting the wavelength-converted ray into parallel rays.

3. An optical pickup as set forth in claim 2, wherein said axicon lens is an axicon lens of truncated cone shape, and the source ray and the wavelength converted ray respectively pass through a parallel plate-like portion and a conical portion of the axicon lens.

4. An optical pickup as set forth in claim 2, wherein said axicon lens is a Fresnel type axicon lens comprising a center portion of flat shape and other portion forming a concentric circular grating with regular intervals, and the source ray passes through the center portion and the wavelength-converted ray passes through the other portion respectively.

5. An optical pickup as set forth in claim 1, wherein said optical system has an aberration correcting lens in the optical path through which only the source ray passes.

6. An optical pickup as set forth in claim 1, wherein said source ray is used to red information recorded on an optical disk having a standard recording density and wherein said wavelength-converted ray is used to read information recorded on an optical disk having a high recording density.

* * * * *